(12) United States Patent
Greenberg et al.

(10) Patent No.: US 7,975,354 B2
(45) Date of Patent: Jul. 12, 2011

(54) BLADED DISK ASSEMBLY METHOD AND IMPACT DEVICE

(75) Inventors: Michael D. Greenberg, Bloomfield, CT (US); Keith E. Charette, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 1190 days.

(21) Appl. No.: 11/703,988

(22) Filed: Feb. 8, 2007

(65) Prior Publication Data

US 2008/0193293 A1 Aug. 14, 2008

(51) Int. Cl.
*B21K 25/00* (2006.01)

(52) U.S. Cl. .................................. 29/23.51; 29/889.21

(58) Field of Classification Search .................. 29/23.51, 29/889.21, 785, 790, 889, 889.1; 269/35, 269/40, 296
See application file for complete search history.

(56) References Cited

U.S. PATENT DOCUMENTS

| 2,821,778 A * | 2/1958 | Wilken ........................... 269/40 |
| 3,681,837 A | 8/1972 | Franklin |
| 4,798,520 A * | 1/1989 | Partington et al. ........ 416/219 R |
| 4,884,951 A * | 12/1989 | Meylan et al. ................. 416/191 |
| 5,257,442 A * | 11/1993 | Tanaka et al. ................. 29/23.51 |
| 5,666,724 A * | 9/1997 | Kolsun ....................... 29/888.02 |
| 5,737,816 A * | 4/1998 | Hartmann et al. ........... 29/23.51 |
| 6,061,886 A * | 5/2000 | Nitta et al. ................... 29/23.51 |
| 7,320,172 B1 * | 1/2008 | Kamiya .......................... 29/809 |
| 2009/0183349 A1 * | 7/2009 | Walsh et al. ................. 29/23.51 |

FOREIGN PATENT DOCUMENTS

| DE | 4409686 | 9/1995 |
| EP | 1429033 | 6/2004 |
| JP | 60011603 | 1/1985 |

OTHER PUBLICATIONS

Official Search Report and Written Opinion of the European Patent Office in counterpart foreign Application No. EP 08250444 filed Feb. 7, 2008.

\* cited by examiner

*Primary Examiner* — David P Bryant
*Assistant Examiner* — Ryan J Walters
(74) *Attorney, Agent, or Firm* — Kinney & Lange, P.A.

(57) ABSTRACT

A bladed disk assembly device includes a horizontal arm and a fixed vertical pivot bar that is perpendicularly attached to a first end of the horizontal rotating arm via a sliding coupling mechanism. A vibratory impact device is attached to a second end of the horizontal rotating arm and generates a vibrating motion via a power source. An impact shoe is attached to the vibratory impact device and drives a blade into a disk slot.

15 Claims, 2 Drawing Sheets

BLADED DISK ASSEMBLY METHOD AND IMPACT DEVICE

CROSS-REFERENCE TO RELATED APPLICATIONS

This application discloses subject matter related to copending U.S. patent application entitled, "BLADED DISK ASSEMBLY METHOD AND ROLLER DEVICE".

BACKGROUND OF THE INVENTION

1. Field of the Invention

The present disclosure relates to the assembly of bladed disks. More specifically, the present disclosure relates to assembly methods and devices that aid in the installation of shrouded or other high aspect ratio blades in a compressor or turbine disk of aero or land based gas turbine engines.

2. Description of Related Art

Gas turbine engine blades have roots that are installed into broached slots in the outer diameter of a disk. The blades have a curved airfoil portion extending radially outward from the blade root and longer blades include a shroud on the distal end of the airfoil portion. When the blades are installed in the disk, the shrouds on the ends of the blades interlock with the shrouds of adjacent blades at a z-notch, which increases damping and thereby reduces blade dynamic response. The z-notches also restrict leakage flow around the blades. But, the shrouded blade design makes the blades difficult to install because they are designed to twist when being seated into the broached slots to provide loading on the shroud dampers.

The installation of shrouded blades in a disk is traditionally accomplished by manually hammering the roots of each of the blades into the disk with a non metallic mallet. The roots of the blades are seated in the disk slots by hammering them down into the broached slots, which may be configured as a fir tree shape. The blades are gradually driven into the broached slots in a circular manner by making multiple trips around a table/wheel that holds the disk in place while the blades are being installed. This method of manual blade installation is relatively time consuming and can cause impact damage to the blade root and/or broached disk slot. Root seal strip materials may require additional effort and force.

Accordingly, there is a need for a device to install unshrouded, shrouded or high aspect ratio blades into a disk that can improve the current assembly process. For example, a novel installation device that installs blades in a more controlled manner that prevents jamming and damaging of the blade roots or broached slots is needed. An improved installation method is also needed that is faster and does not require the repetitive manual hammering against the blade roots.

SUMMARY OF THE INVENTION

The present disclosure provides a blade installation device that includes a horizontal rotating arm and a fixed vertical pivot bar that is perpendicularly attached to a first end of the horizontal rotating arm via a sliding coupling mechanism. A vibratory impact device is attached to a second end of the horizontal arm that generates a vibrating motion via a power source. An impact shoe is attached to the vibratory impact device, which drives a turbine blade into a disk slot while simultaneously interlocking the outer shrouds at a z-notch.

The above-described and other features and advantages of the present disclosure will be appreciated and understood by those skilled in the art from the following detailed description, drawings, and appended claims.

DETAILED DESCRIPTION OF THE INVENTION

Figure 1:
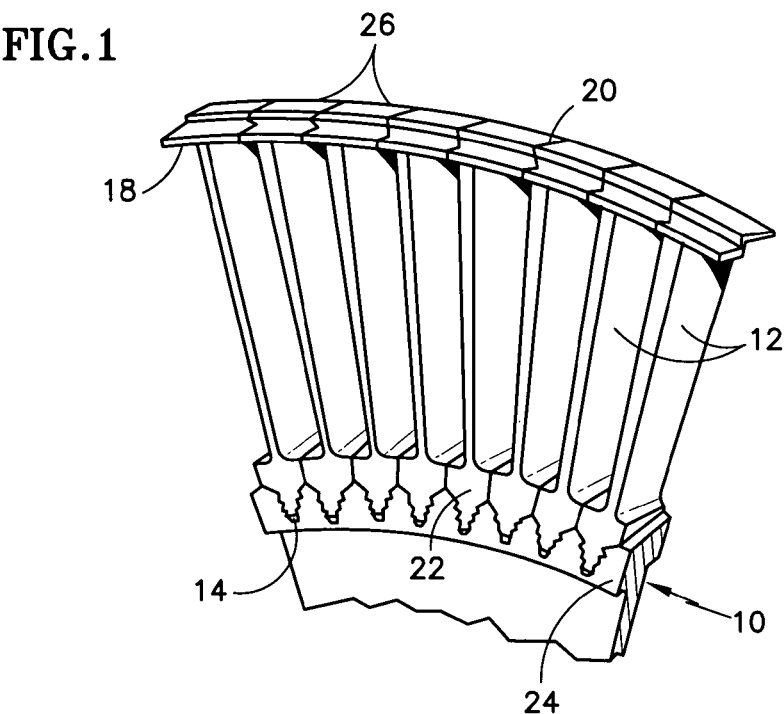
FIG. 1 illustrates a partial perspective view of a typical disk with shrouded blades installed according to the present disclosure.

Referring now to the drawings and in particular to FIG. 1, a disk, such as typically used in a turbine section of a gas turbine engine and generally referred to by reference number 10 is shown. The disk 10 has a plurality of shrouded blades 12 installed thereabout. The disk 10 has an outer rim 24 that receives a root portion 22 of blade 12. The outer rim 24 of disk 10 has a plurality of fir tree shaped slots 14, otherwise known as broached slots that receive the blade root 22 of blade 12. Each blade 12 has an interlocking shroud 26 on the distal end 18 of blade 12. The interlocking shrouds 26 of adjacent blades 12 mate at a matching z-notch 20. The z-notch shrouds 20 aid in restricting leakage around the distal ends 18 of the blades 12 as well as provide blade vibratory damping.

The blade installation method of the present disclosure begins by loosely engaging blade root 22 of blade 12 with fir tree slot 14 so that blade root 22 has slack in the slot 14. Blade 12 is not fully engaged with fir tree 14 so that the outer shroud 26 can be simultaneously twisted into position and interlocked at the z-notch 20. Outer shroud 26 is designed to be twisted and loaded when being seated into place as blade 12 is fully engaged with disk 10.

Figure 2:
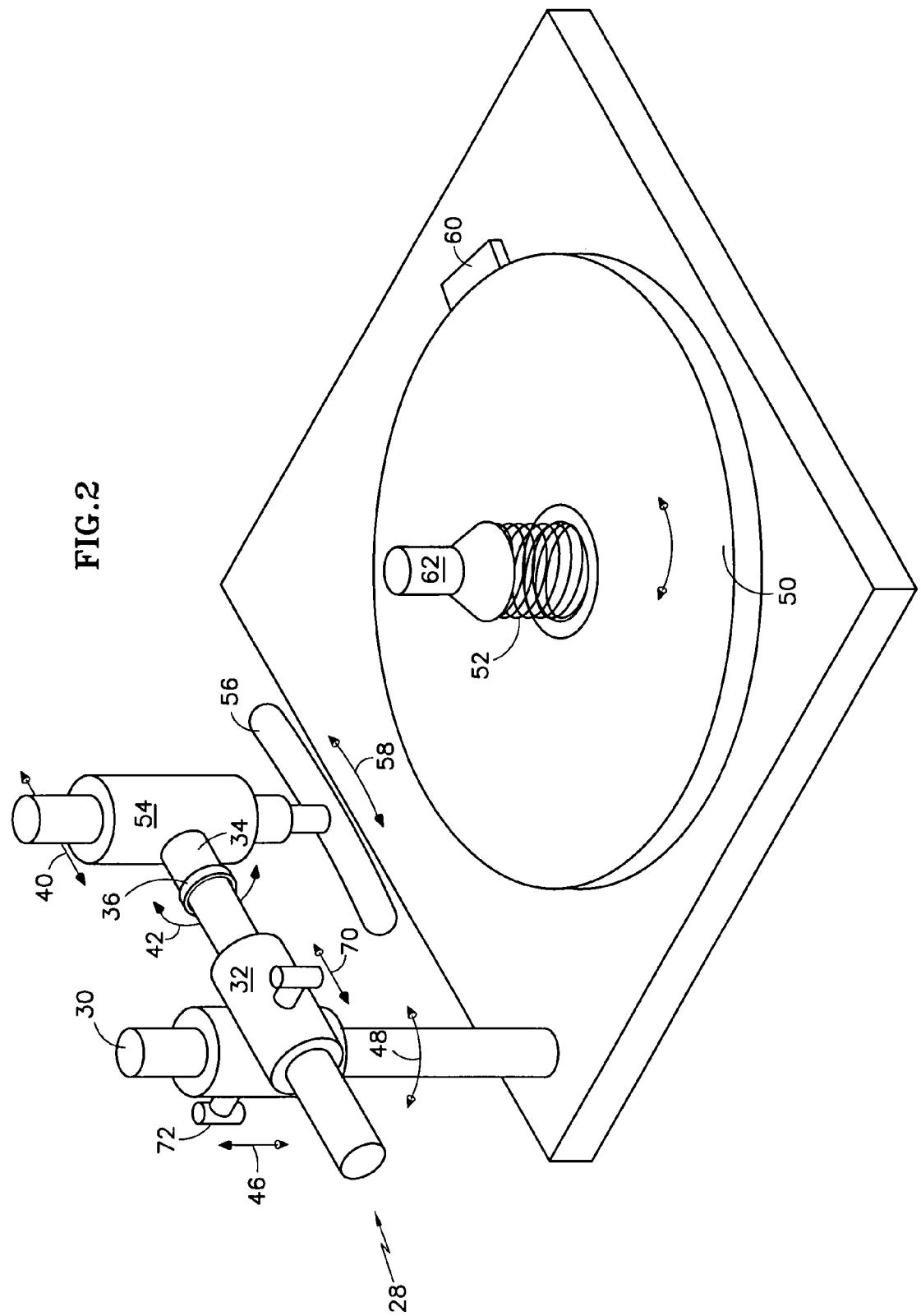
FIG. 2 illustrates a perspective view of an embodiment of a blade installation device.

Referring now to FIG. 2, a blade installation device according to an embodiment of the present disclosure is shown, generally referred to by reference number 28. A disk 10 is not shown installed for clarity. Installation device 28 has a fixed vertical pivot bar 30 that is mounted onto the fixed base of a rotary table 50. A horizontal arm 34 is connected to vertical pivot bar 30 via a sliding coupling mechanism 32 that is adjustable in height by loosening locking knob 72. Sliding coupling mechanism 32 allows for vertical height adjustment 46 and radial movement 70, in relation to a disk 10, to accommodate various diameter disks. Sliding coupling mechanism 32 is adjustable for angle 48 that allows installation device 28 to rotate about a longitudinal axis of vertical pivot bar 30 which allows it to move out of the way as the disk 10 is lowered from above onto rotary table 50, as well as provide proper contact of shoe 56 with blade root 22.

Rotary table 50 is rotationally driven by a stepping motor 60, or other drive device, that can be set to rotate table 50 at variable speeds or discrete positions, in a stepwise fashion, in either direction. Rotary table 50 may have a non-slip surface, a protective surface, a vibration absorbing surface, guide pins and/or drive pins to properly locate and secure the disk to the table and prevent slipping of or damage to the disk. An interchangeable, spring loaded centering cone 52 is located in the center of rotary table 50 and functions to load the disk onto a self-centering mandrel 62. Each interchangeable cone is sized to fit a particular disk. Spring loaded centering cone 52 is used when installation device 28 is positioned in a way such that horizontal arm 34 reaches from the outside of the disk toward the inside of the disk to make it easier to load the disk onto rotary table 50. The device may also include a lockdown coupling (not shown) that clamps the disk against the table through threads on mandrel 62 or clamps on rotary table 50.

A vibratory impact device 54 is attached to the distal end of horizontal arm 34 via a pivot coupling. Impact device 54 has variable load and/or variable frequency adjustments. Impact device 54 has an impact shoe 56 that drives the blades into the slots 14 automatically without damaging the blades 12 or the disk 10. Electric, hydraulic, pneumatic, or any other type of power can drive the impacting device 54. The impact provided by impact device 54 is created by either a spring loaded preload, a dead weight, an actuated piston, an electromechanical actuator, an impact loading and gravity, or any combinations thereof. Impact device 54 is capable of radial adjustment 40 and angular adjustment 42 via a pivot coupling, which allows the angle of incidence of impact shoe 56 to be adjusted.

Impact shoe 56 may be stiff or flexible as along as it has an adjustable shoe angle 58 so that it is capable of rotation about an axis of impact. Impact shoe 56 is composed of a hard, smooth and non-marring material such as raw hide, plastic, soft metals, coated metals, urethane rubber, or various combinations thereof.

The horizontal arm 34 of installation device 28 may be automated or may be operated manually. Horizontal arm 34 may have an adjustable sliding weight 36 thereon that functions to counterbalance the action of impact shoe 56.

The blade installation method of the present disclosure simulates manual installation using a blade installation device 28. Installation device 28 drives blades 12 into slots 14 using light single-blade or multi-blade impact combined with either manual or automated rotation of the turbine disk 10 on the rotary table 50. An angle of incidence of impact shoe 56 relative to the blade root 22 and slot 14 imparts a twist on the blade when it is driven into the disk, which enables the outer shrouds to interlock. The vertical pivot bar 30 can also be centered inside the disk so that the horizontal arm 34 extends from the inner diameter of the disk, also known as the bore, toward an outer rim (not shown). As shown, the horizontal arm 34 may extend from an outer edge of rotary table 50 toward the center of the disk.

Variables such as table rotation speed, vibratory load, frequency, stepped position, rotation direction, angle of incidence and shoe pivot are developed on a case by case basis and are stored for later recall. A controller may also be used to synchronize the impact of impact shoe 56 with the rotation or positioning of rotary table 50 to completely automate the installation process. The rotation of the rotary table 50 may be in discrete steps via a stepper motor or continuous.

Figure 3:
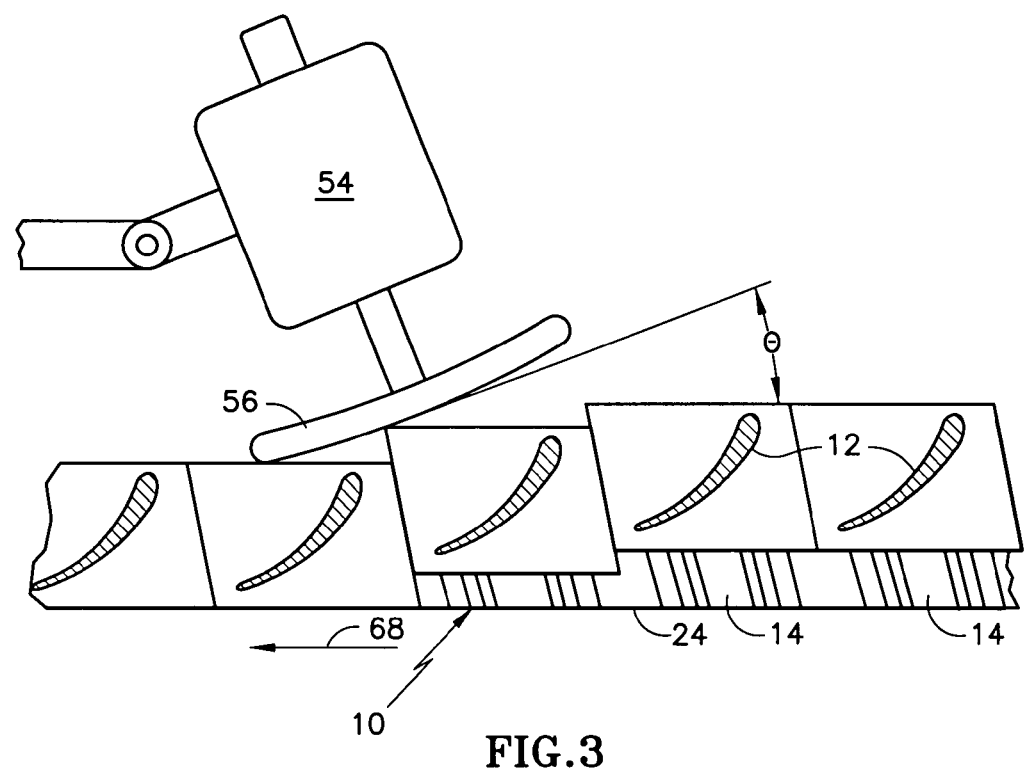
FIG. 3 illustrates a partial side view of a vibratory impact device of the installation device and the rotational motion of the disk of the installation device according to the present disclosure, with the shroud portion of the blades removed for clarity.

Referring now to FIG. 3, the interaction of vibratory impact device 54 with the blade roots according to the present disclosure is shown. FIG. 3 illustrates impact shoe 56 of impact device 54 applying a force at an incidence angle theta (θ) while the turbine disk 10 rotates in direction 68. The opposing force allows impact shoe 56 to adjust to its preferred angle of incidence so that the blade roots 22 are properly seated in fir tree slots 14. The vibratory impact of the shoe 56 against the roots 22 along with the rotation of the disk 10 causes the outer shrouds 26 to interlock and load at the z-notches 20. Impact shoe 56 may impact with a single blade individually or alternatively, impact shoe 56 may operate in a continuous motion such that it impacts multiple blades simultaneously.

While the present disclosure has been described with reference to one or more exemplary embodiments, it will be understood by those skilled in the art that various changes may be made and equivalents may be substituted for elements thereof without departing from the scope of the present disclosure. For example, the methods and devices disclosed may be used to assemble bladed disks for compressor or turbine sections of aero, marine or land based turbines. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A device for use in assembling a bladed disk assembly comprising:
   a rotary table to support a slotted disk;
   a fixed vertical pivot bar;
   a horizontal arm with a first end attached to said vertical pivot bar;
   a vibratory impact device attached to a second end of said horizontal arm; and
   an impact shoe attached to said vibratory impact device and configured to drive a blade root into a corresponding slot in the slotted disk and to simultaneously cause outer shrouds of adjacent blades to interlock as the table rotates.

2. The device of claim 1, wherein said horizontal arm is attached to said vertical pivot bar via a sliding coupling mechanism.

3. The device of claim 2, wherein said sliding coupling mechanism comprises locking knobs that may be tightened or loosened to provide for vertical and radial adjustment.

4. The device of claim 2, wherein said sliding coupling mechanism is adjustable for angle.

5. The device of claim 1, wherein said vibratory impact device generates a vibrating motion via a power source.

6. The device of claim 1, wherein said rotary table is manually rotated.

7. The device of claim 1, wherein said rotary table is automatically rotated.

8. The device of claim 1, wherein said impact shoe comprises a hard, smooth and non-marring material.

9. The device of claim 1, wherein said impact shoe comprises an adjustable shoe angle that allows it to rotate about an axis of impact.

10. The device of claim 1, wherein said vibrating impact device comprises an angular adjustment that allows an angle of incidence of said impact shoe to be set to impart twist to the blade being driven into the corresponding slot to facilitate interlocking the outer shrouds of adjacent blades.

11. The device of claim 1, wherein said vertical pivot bar is positioned radially outward of said rotary table so that said horizontal arm extends from an outer edge of the disk toward the center of the disk.

12. The device of claim 1, wherein said vibratory impact device comprises a source of impact selected from the group consisting of a spring loaded preload, a dead weight, an actuated piston, an electromechanical actuator, an impact loading and gravity, and any combinations thereof.

13. The device of claim 1, wherein the disk is secured to the rotary table.

14. The device of claim 13, wherein said rotary table has a spring loaded cone to center the disk with said table.

15. The device of claim 1, wherein said horizontal arm further comprises a weight that counterbalances the mass of said impact shoe.

* * * * *

Disclaimer

7,975,354—Michael D. Greenberg, Bloomfield, CT (US); Keith E. Charette, Meriden, CT (US). BLADED DISK ASSEMBLY METHOD AND IMPACT DEVICE. Patent dated July 12, 2011. Disclaimer filed April 1, 2011, by the assignee, United Technologies Corporation.

Hereby enters the term of this patent not to exceed beyond the expiration date of Ser. No.12/009,715 filed January 22, 2008.

*(Official Gazette September 20, 2011)*

UNITED STATES PATENT AND TRADEMARK OFFICE
CERTIFICATE OF CORRECTION

| | | |
|---|---|---|
| PATENT NO. | : 7,975,354 B2 | Page 1 of 1 |
| APPLICATION NO. | : 11/703988 | |
| DATED | : July 12, 2011 | |
| INVENTOR(S) | : Michael D. Greenberg and Keith E. Charette | |

It is certified that error appears in the above-identified patent and that said Letters Patent is hereby corrected as shown below:

Col. 1, Line 10
Insert --, having assignee docket number PA-0000941-US-- after "DEVICE"

Signed and Sealed this
Eleventh Day of October, 2011

David J. Kappos
*Director of the United States Patent and Trademark Office*